United States Patent [19]
Christoff

[11] Patent Number: 4,503,666
[45] Date of Patent: Mar. 12, 1985

[54] AIRCRAFT ENVIRONMENTAL CONTROL SYSTEM WITH AUXILIARY POWER OUTPUT

[75] Inventor: William J. Christoff, Thousand Oaks, Calif.

[73] Assignee: Rockwell International Corporation, El Segundo, Calif.

[21] Appl. No.: 494,824

[22] Filed: May 16, 1983

[51] Int. Cl.³ .............................................. F02C 6/08
[52] U.S. Cl. ................................. 60/39.07; 60/39.183
[58] Field of Search ............ 60/39.07, 39.142, 39.183, 60/39.33; 62/323.4, DIG. 5; 98/1.5

[56] References Cited

U.S. PATENT DOCUMENTS

| | | | |
|---|---|---|---|
| 2,618,470 | 11/1952 | Brown et al. | 60/39.07 |
| 2,772,621 | 12/1956 | Arnoldi | 60/39.07 |
| 2,777,301 | 1/1957 | Kuhn | 60/39.07 |
| 3,965,673 | 6/1976 | Friedrich | 60/39.142 |
| 4,091,613 | 5/1978 | Young | 60/39.07 |

*Primary Examiner*—Louis J. Casaregola
*Attorney, Agent, or Firm*—H. Fredrick Hamann; Harry B. Field

[57] ABSTRACT

An environmental control system for a jet aircraft has a single compressor coupled to a cooling turbine and an auxiliary power turbine. The compressor provides air to both turbines. Air to the power turbine is mixed with fuel to form combustion gases to drive the turbine. Air to the cooling turbine is cooled by expansion and used for air conditioning the aircraft cabin. The auxiliary power turbine can be decoupled and the compressor driven by the cooling turbine, which is powered by bleed air from the main engine of the aircraft.

8 Claims, 1 Drawing Figure

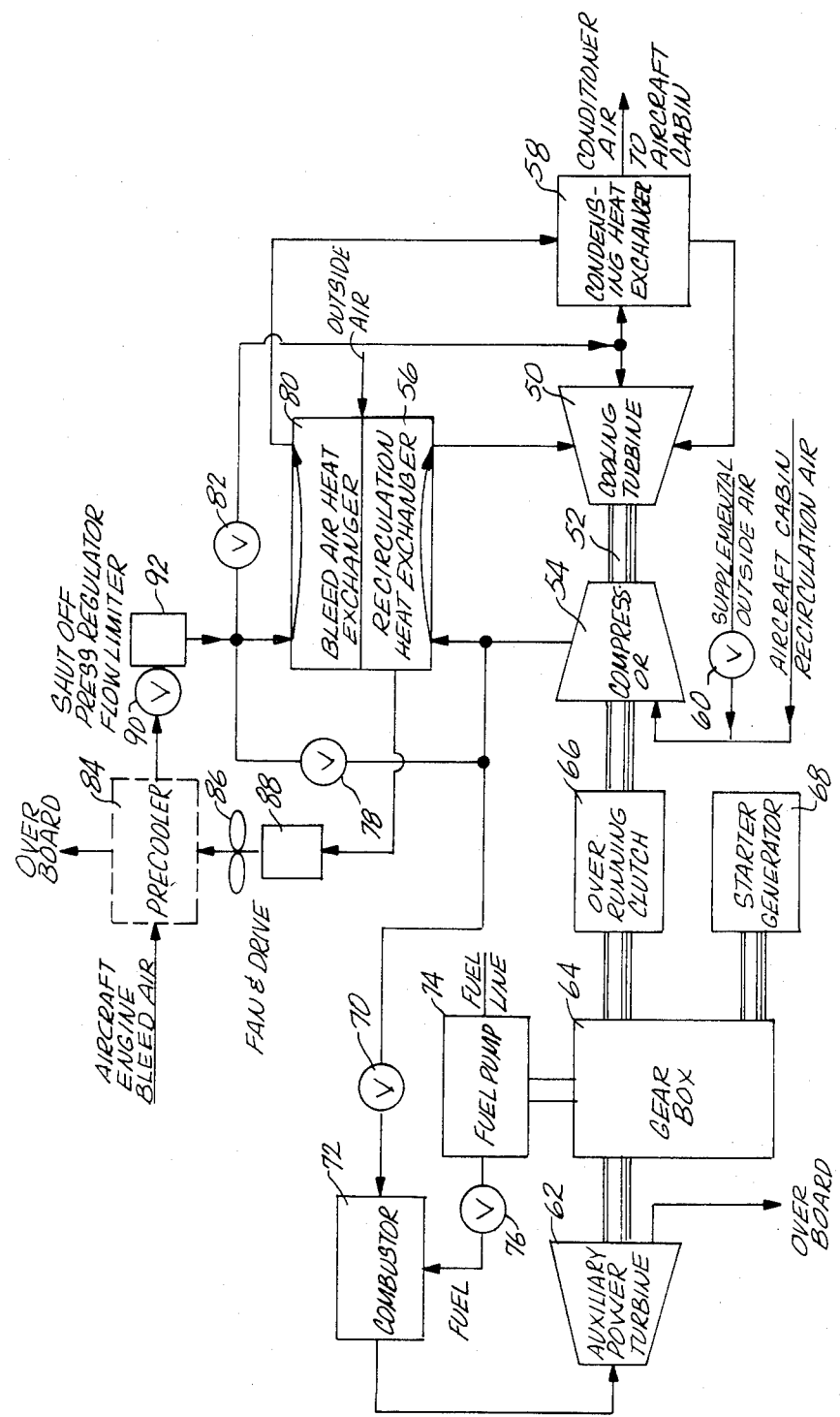

AIRCRAFT ENVIRONMENTAL CONTROL SYSTEM WITH AUXILIARY POWER OUTPUT

CROSS-REFERENCE TO RELATED APPLICATION

This application is related to co-pending application Ser. No. 422,118 filed Sept. 23, 1982, in the name of the same inventor as the present application.

FIELD OF THE INVENTION

This invention relates to aircraft environmental control systems and, more particularly, to an integrated auxiliary power and environmental control unit for jet aircraft and the like.

BACKGROUND OF THE INVENTION

Environmental control systems for jet aircraft function to maintain cabin temperature and pressure at the required comfort level for passengers. Systems operated with auxiliary power and without auxiliary power have heretofore been proposed. Aircraft without auxiliary power operate the main engines at sufficient power to provide compressed air to power the environmental control system when the aircraft is on the ground as well as in the air. However, operating the main engines on the ground results in higher than necessary engine operating costs, including inefficient fuel consumption and increased maintenance and overhaul per aircraft per flight hour. To add auxiliary power also has its price in terms of procurement and installation cost, operating cost and loss of payload due to added weight of the auxiliary power system.

In prior systems having auxiliary power, a prime mover, usually a gas turbine, may mechanically drive a compressor or the compressor may be driven by bleed air from a compressor that is part of the prime mover and is input to the cooling turbine of the environmental control unit. It has been conventional to drive the compressor of the environmental control unit at maximum output to provide a maximum flow rate for the limiting heating or cooling condition and adjust the output flow temperature by flow mixing through a temperature control valve.

SUMMARY OF THE INVENTION

The present invention provides an improved integrated auxiliary power and environmental control unit which is an improvement on the conventional systems and which is particularly suited to smaller jet aircraft systems in which saving weight to increase payload becomes a more significant cost factor. The system of the present invention contains fewer components than a separate environmental control system and auxiliary power unit. Specifically, the present system shares a single compressor between the auxiliary power unit and the environmental control system. The present invention provides for a single integrated unit, thereby simplifying and reducing the weight of the mounting and interface components necessary in installation of the auxiliary power and environmental control units.

The advantages of the present invention are achieved, in brief, by providing a power turbine and a cooling turbine mechanically coupled to a single compressor. The cooling turbine combines with the compressor to form an environmental control unit. When the compressor is directly driven by the power turbine, it provides compressed air to the combustor for fueling the power turbine while at the same time providing compressed air to the cooling turbine for providing cooled air to the air conditioning system. During inflight operation when auxiliary power is not required, the compressor is decoupled from the power turbine and bleed air from the plane's propulsion engines is used to drive the cooling turbine which in turn mechanically drives the compressor. Thus the single compressor of the present invention replaces two compressors heretofore required in prior art equipment. This provides substantial reduction in weight and size, which can be translated into increased payload.

In addition, variable exit vanes in the compressor can be adjusted to regulate flow to the turbine and also cause a portion of the compressor discharge air to be diverted to the combustor for the power turbine and, if desired, for other purposes such as driving an engine starter motor.

DESCRIPTION OF THE DRAWING

For a better understanding of the invention, reference should be made to the accompanying drawing, wherein the single FIGURE is a schematic diagram of the environmental control system of the present invention.

DETAILED DESCRIPTION

Referring to the drawing in detail, the environmental control unit for maintaining cabin pressure and temperature includes a cooling turbine 50 which is connected through a common shaft 52 to a compressor 54. Aircraft cabin recirculation air is directed to the input of the compressor 54 where it is compressed, cooled by a recirculation heat exchanger 56 to lower the compressed air temperature to ambient temperature before being input to the cooling turbine 50. Air passing through the cooling turbine 50 expands, lowering its temperature. The cooled air then passes through a condensing heat exchanger 58 and then is returned to the aircraft cabin. Supplemental outside air can be added to the recirculated cabin air through a valve 60 at the input to the compressor 54.

The cooling turbine 50 and the compressor 54 are driven mechanically by an auxiliary power turbine 62 through a suitable gear box transmission 64 and an over-running clutch 66. The over-running clutch automatically decouples the power turbine 62 from the compressor 54 when the power turbine is not operating. To start the auxiliary power turbine 62, a starter generator 68 rotates both the turbine 62 and the compressor 54 through the gear box 64. A hydraulic start motor could also be used if a pressurized hydraulic fluid source is available. Compressed air from the outlet of the compressor 54 is directed through a valve 70 into a combustor 72. Fuel is injected into the combustor 72 by means of a fuel pump 74 driven from the gear box 64 through a valve 76. The fuel air-mixture is burned in the combustor and the gases are directed through the auxiliary power turbine 62 to operate the turbine and drive the compressor 54 and cooling turbine 50. Thus the compressor 54 provides the dual function of supplying cabin air through the cooling turbine 50 and supplying air to the combustor 72 for powering the auxiliary power turbine 62.

Air from the compressor 54 is also directed through a valve 78 and through a bleed air heat exchanger 80 to the cooling turbine 50 through the condensing heat exchanger 58. Moisture in the air is condensed by the heat exchanger 58 due to the cooling effect of the air from the cooling turbine 50 as it passes to the aircraft cabin. Alternatively, the bleed air can be directly inputted by the cooling turbine and the moisture removed at the output from the turbine by a water separator. A temperature control valve 82 allows warm air from the compressor 54 to bypass the cooling turbine 50 and be injected directly into the cooled air from the output of the cooling turbine. By varying the amount of warm air added through the valve 82, the temperature of the air going to the aircraft cabin can be controlled.

As thus far described, the system of the drawing provides a self-contained environmental control system with an integrated auxiliary power unit. The system requires only a single compressor providing pressurized air to the aircraft cabin which is temperature and humidity conditioned and also provides compressed air for fueling the power turbine 62. The cooling turbine 50 can be maintained at substantially constant pressure so as to assure efficient operation by using diffuser vanes to control the partitioning of air flow to the turbine 24 in the manner described in related application Ser. No. 422,118.

When the main propulsion engines of the jet aircraft are operating, it is possible to operate the environmental control system from compressed air derived from the jet engine compressors. This bleed air from the aircraft engine is precooled by a heat exchanger or precooler 84. Outside air is circulated through the recirculation heat exchanger 56, the bleed air heat exchanger 80, and the precooler 84 by a fan 86 which may be driven electrically by a motor 88 which may be powered either from the generator 68, by the power turbine 62, or off the electrical system driven by the main propulsion engines.

After being cooled, the bleed air is directed through the bleed air heat exchanger 80 by means of a valve 90 and pressure regulator and flow limiter 92. The bleed air is thus admitted to the cooling turbine 50 to drive the cooling turbine 50 and thereby drive the compressor 54. Under normal operating conditions, the bleed air is sufficient to maintain the operation of the environmental control system without any additional input from the power turbine 62. Thus the power turbine 62 can be shut down by closing the valves 70 and 76. The power turbine is automatically decoupled from the compressor 54 by the over-running clutch 66. During takeoff when the propulsion engine is operating at maximum load, the auxiliary power turbine 62 may also be operated so as to reduce the requirement for bleed air from the main aircraft engines.

It is to be understood that what has been described is merely illustrative of the principles of the invention and that numerous arrangements in accordance with this invention may be devised by one skilled in the art without departing from the spirit and scope thereof.

What is claimed is:

1. An environmental control system for a jet engine propelled aircraft, comprising:
an air compressor, a cooling turbine, an overrunning clutch, and a power turbine rotatively coupled to the compressor and the cooling turbine, the clutch being located between the power turbine and said other components, means directing compressed air from the compressor to the power turbine, means for mixing fuel with said compressed air and burning said mixture to fuel the power turbine and drive the compressor, means for directing compressed air from the compressor to the cooling turbine, the cooling turbine expanding and cooling the compressed air, and means using the cooled output air of the cooling turbine to air-condition the aircraft.

2. Apparatus of claim 1 further including valve means for selectively connecting the input to the cooling turbine to either the output of the compressor or to bleed air from the jet engine.

3. Apparatus of claim 2 further including valve means for selectively stopping the flow of air from the compressor to the power turbine to interrupt operation of the power turbine.

4. An integrated air conditioning system for an aircraft propelled by one or more jet engines, comprising:
a compressor and cooling turbine mechanically coupled for rotation as a unit, an overrunning clutch, an auxiliary power turbine mechanically coupled through said clutch to the compressor for driving the compressor and cooling turbine, means directing a portion of the air from the compressor to the power turbine for use in driving the power turbine, means directing a portion of the air through the cooling turbine to the aircraft interior, and means mixing a further portion of the air from the compressor with the air from the cooling turbine to control the temperature of the air to the aircraft.

5. Apparatus of claim 4 further including means for directing bleed air from the jet engines to the cooling turbine to drive the turbine.

6. Apparatus of claim 5 further including means for interrupting the flow of air from the compressor to the power turbine when bleed air is directed to the cooling turbine.

7. Apparatus of claim 6 further including means for decoupling the power turbine from the compressor when the flow of air to the power turbine in interrupted.

8. Apparatus of claim 7 wherein said means for decoupling includes said over-running clutch.

* * * * *